(12) United States Patent
Kimura et al.

(10) Patent No.: US 8,905,173 B2
(45) Date of Patent: Dec. 9, 2014

(54) CONSTRUCTION MACHINE

(75) Inventors: Shogo Kimura, Ritto (JP); Tomoyuki Tanaka, Yasu (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/991,292

(22) PCT Filed: Feb. 8, 2012

(86) PCT No.: PCT/JP2012/052866
§ 371 (c)(1),
(2), (4) Date: Jun. 3, 2013

(87) PCT Pub. No.: WO2012/114878
PCT Pub. Date: Aug. 30, 2012

(65) Prior Publication Data
US 2013/0322999 A1    Dec. 5, 2013

(30) Foreign Application Priority Data
Feb. 24, 2011    (JP) ................................. 2011-038649

(51) Int. Cl.
*B62D 33/06* (2006.01)
*E02F 3/30* (2006.01)
*E02F 3/32* (2006.01)
*E02F 9/16* (2006.01)
*B60J 5/04* (2006.01)

(52) U.S. Cl.
CPC . *E02F 9/163* (2013.01); *E02F 3/30* (2013.01); *E02F 3/325* (2013.01); *B62D 33/0617* (2013.01); *B60J 5/0487* (2013.01)
USPC ...................................................... 180/89.12

(58) Field of Classification Search
CPC ......... E02F 9/163; E02F 3/325; B60J 5/0487; B62D 33/0617
USPC ............. 180/89.12, 89.13, 89.19; 292/95, 96, 292/100, 194, 195, 200, 216; 296/146.5, 296/190.01, 190.03, 193.04, 190.05, 296/190.06, 190.11, 193.06
See application file for complete search history.

(56) References Cited

U.S. PATENT DOCUMENTS 6,189,955 B1 * 2/2001 Fryk et al. ................. 296/190.08
6,325,450 B2 * 12/2001 Sakyo et al. ............. 296/190.08
(Continued)

FOREIGN PATENT DOCUMENTS

JP        7-10063 U      2/1995
JP    2001-207479 A      8/2001
(Continued)

*Primary Examiner* — Paul N Dickson
*Assistant Examiner* — Robert A Coker
(74) *Attorney, Agent, or Firm* — Mattingly & Malur, PC

(57) ABSTRACT

A cab (8) is provided with a cab box (13) in which a space between each of pillars (14 to 18) is covered by each of surfaces (13A to 13F) and the inside becomes an operator's room (13G) and a door (24) mounted on the left intermediate pillar (16). On a rear surface portion (14D) of the left front pillar (14), a protruding portion (23A1) of a mounting plate (23A) is provided in a state protruding to the door (24) side. On a mounting opening (24E) on the inner surface side of the door (24), a door holding member (28) engaged with an engaging member (23) and holding the door (24) at a closed position is provided. On the door (24), a retreating recessed portion (29) for avoiding interference with the protruding portion (23A1) of the mounting plate (23A) is provided on the front side from the door holding member (28).

5 Claims, 14 Drawing Sheets

(56) References Cited

U.S. PATENT DOCUMENTS

| | | | |
|---|---|---|---|
| 7,434,869 B2 * | 10/2008 | Murakami | 296/190.03 |
| 7,575,272 B2 * | 8/2009 | Ishii et al. | 296/190.04 |
| 7,770,963 B2 * | 8/2010 | Tsukamoto et al. | 296/190.08 |
| 8,235,457 B2 * | 8/2012 | Yamamoto et al. | 296/190.03 |
| 2007/0132277 A1 * | 6/2007 | Ishii et al. | 296/190.01 |
| 2009/0127888 A1 * | 5/2009 | Tsukamoto et al. | 296/190.03 |
| 2010/0181797 A1 * | 7/2010 | Hitomi | 296/146.5 |

FOREIGN PATENT DOCUMENTS

| | | |
|---|---|---|
| JP | 2004-306797 A | 11/2004 |
| JP | 2005-351017 A | 12/2005 |
| JP | 2009-215702 A | 9/2009 |

* cited by examiner

CONSTRUCTION MACHINE

TECHNICAL FIELD

The present invention relates to a construction machine such as a hydraulic excavator provided with a cab on which an operator gets onboard, for example.

BACKGROUND ART

In general, hydraulic excavators as construction machines include a small-sized hydraulic excavator called a mini excavator suitable for a work on a small work site, and this small-sized hydraulic excavator is formed having a small upper revolving structure so as to be suitable for running and works on a small site.

Here, the small-sized hydraulic excavator is composed of an automotive lower traveling structure, the upper revolving structure rotatably mounted on the lower traveling structure and having a cab provided on a revolving frame forming a support structural body, and a working mechanism provided on the front side in a front-rear direction of the upper revolving structure capable of moving upward/downward.

On the other hand, the cab of the hydraulic excavator has five pillars provided extending in the vertical direction while being located on the left front, right front, left intermediate, left rear, and right rear and the cab has a cab box in which a space between each pillar is covered by a front surface, a left front side surface, a left rear side surface, a right side surface, a rear surface, and a top surface and the inside becomes an operator's room. In this cab box, a door is provided having a rear end portion rotatable in the front-rear direction by using the left intermediate pillar as a fulcrum in order to open/close an entrance way between the left front pillar and the left intermediate pillar.

Moreover, an engaging member is mounted on the rear surface portion of the left front pillar. This engaging member is composed of a mounting plate mounted on an intermediate portion in a height direction of the rear surface portion and a substantially U-shaped engaging ring provided protruding rearward from the mounting plate. Here, the engaging member is mounted on the left front pillar by screwing the mounting plate with the rear surface portion.

In this case, a door holding member engaged with the engaging ring and holding the door at a closed position is provided on the front end side of the door corresponding to the engaging member when the door is rotationally moved in a closing direction (Patent Document 1).

PRIOR ART DOCUMENT

Patent Document

Patent Document 1: Japanese Patent Laid-Open No. 2009-215702 A

SUMMARY OF THE INVENTION

Regarding the hydraulic excavator according to the above-described Patent Document 1, since the door holding member is provided in a state extended to the operator's room side from the inside of the door, the door holding member increases the thickness of the inner surface side of the door. As a result, when the door is closed, the door holding member gives a feeling of oppression to the operator's room by the portion extended to the operator's room, and there are problems that a living space becomes small and a work environment deteriorates.

On the other hand, in a case where the door holding member largely extends to the inside of the door, when a work is to be carried out by opening the door so as to follow the left rear side surface, the door holding member can be easily brought into contact with an obstruction around it. Thus, an operator should pay attention so that the door holding member does not touch an obstruction, which also causes a problem of deteriorated workability.

In view of the above-discussed problems with the conventional art, it is an object of the present invention to provide a construction machine which can improve a work environment in the cab or workability while the door is open by suppressing extension of the door holding member from the door to the operator's room side.

(1) A construction machine according to the present invention comprises an automotive lower traveling structure; an upper revolving structure rotatably mounted on the lower traveling structure and having a cab provided on a revolving frame forming a support structural body; and a working mechanism provided on the front side in the front-rear direction of the upper revolving structure, capable of moving upward/downward; the cab being provided with a cab box in which five pillars are provided extending in the vertical direction by being located on left front, right front, left intermediate, left rear, and right rear and a space between each of the pillars is covered by a front surface, a left front side surface, a left rear side surface, a right side surface, a rear surface, and a top surface and the inside becomes an operator's room; and a door having the rear end side mounted on the left intermediate pillar rotatably in the front-rear direction in order to open/close an entrance way between the left front pillar and the left intermediate pillar of the cab box.

In order to solve the above-described problems, a feature of a configuration employed by the present invention is that the left front pillar is formed of a pillar-side stepped surface portion in which an intermediate portion in the front-rear direction of a left side surface portion is bent to the operator's room side, a pillar-side opposite surface portion provided extending to the rear side from a depth portion of the pillar-side stepped surface portion and opposed to the door in a closed state, and a rear surface portion extending from a rear end portion of the pillar-side opposite surface portion to the operator's room side; an engaging member composed of a mounting plate having a protruding portion protruding to the door side from the pillar-side opposite surface portion and an engaging ring protruding rearward from the mounting plate is provided on the rear surface portion of the left front pillar; the door has an outer surface plate forming an outer side surface of the door, an inner surface plate opposite to the outer surface plate and forming an inner side surface of the door, a door-side opposite surface plate arranged inside the outer surface plate by being located on the front side of the inner surface plate and opposed to the pillar-side opposite surface portion when the door is closed, a door-side stepped surface plate forming a step between the inner surface plate and the door-side opposite surface plate, and a mounting opening provided on the door-side stepped surface plate at a position corresponding to the engaging member; a door holding member opposite to the engaging ring of the engaging member and holding the door at a closed position by being engaged with the engaging ring when the door is closed is provided on the mounting opening of the door; a retreating recessed portion located on the front side of the door holding member and recessed toward the outer surface plate is provided on the door-side opposite surface plate of the door; and when the door is brought to the closed position, interference with the protruding portion of the mounting plate of the engaging member is avoided by the retreating recessed portion.

With this arrangement, even if the mounting plate of the engaging member is mounted on the rear surface portion of the left front pillar in a state protruding further to the door side from the pillar-side opposite surface portion, since the retreating recessed portion is provided on the door-side opposite surface plate of the door opposite to the mounting plate, interference between the door and the protruding portion of the mounting plate can be prevented when the door is closed.

Therefore, since the engaging member can be arranged close to the outer side (door side) so as not to protrude to the operator's room side from the left front pillar, the door holding member engaged with this engaging member can be also arranged close to the outer surface plate side of the door. Therefore, the door holding member can be prevented from extending to the operator's room side in the cab and moreover, the thickness dimension of the door can be made small.

As a result, even if the cab to be mounted is small as in a super small-sized hydraulic excavator, for example, the operator's room in the cab can be effectively enlarged, whereby a work environment for an operator can be made favorable. Moreover, since the door holding member is configured not to protrude, even if the door is opened so as to follow the left rear side surface, the door extends only slightly to the outside. As a result, the operator can carry out a work without being excessively aware of the open door, and workability at this time can be improved.

(2) The present invention is characterized by a configuration in which a seal member for sealing a space between the cab box and the door is provided on either one side of the pillar-side opposite surface portion of the left front pillar and the door-side opposite surface plate of the door; and the retreating recessed portion is arranged between the door holding member and the seal member.

With this arrangement, the seal member provided between the pillar-side opposite surface portion of the left front pillar and the door-side opposite surface plate of the door seals a space between the cab box and the door and suppresses intrusion of dusts, outdoor air, noises and the like and prevents rattling of the door. Moreover, the retreating recessed portion can be arranged between the door holding member and the seal member.

(3) The present invention is characterized in that a depth dimension of the retreating recessed portion is set to a value larger than a difference between a protruding dimension of the protruding portion provided on the mounting plate of the engaging member and a width dimension when the seal member is deformed by closing the door. With this arrangement, even if the seal member is largely deformed by closing the door in a rush, collision between the protruding portion of the mounting plate and the retreating recessed portion can be reliably prevented.

(4) The present invention is characterized by a configuration in which the door holding member has a case mounted on the mounting opening of the door and an engaging pawl provided rotatably on the case and engaged with the engaging ring of the engaging member when the door is closed.

With this arrangement, since after the mounting opening is provided in the door-side stepped surface plate on the inner surface side of the door, the case of the door holding member is mounted on this mounting opening, the door holding member can be contained between the outer surface plate and the inner surface plate. When the door is closed, the door can be held at the closed position by engaging the engaging pawl with the engaging ring of the engaging member.

(5) The present invention is characterized by a configuration in which on the outer surface plate of the door, an outer side door knob for operating the engaging pawl from the outside is provided; and on the inner surface plate of the door, an inner side door knob for operating the engaging pawl from the operator's room is provided.

With this arrangement, by operating the outer side door knob or the inner side door knob and rotationally moving the engaging pawl from a state where the door is closed, engagement of the engaging pawl with the engaging ring of the engaging member can be released. In this state, the door can be opened.

MODE FOR CARRYING OUT THE INVENTION

As a construction machine applied to an embodiment of the present invention, a hydraulic excavator with cab specification will be described below in details by referring to FIGS. 1 to 14.

Figure 1:
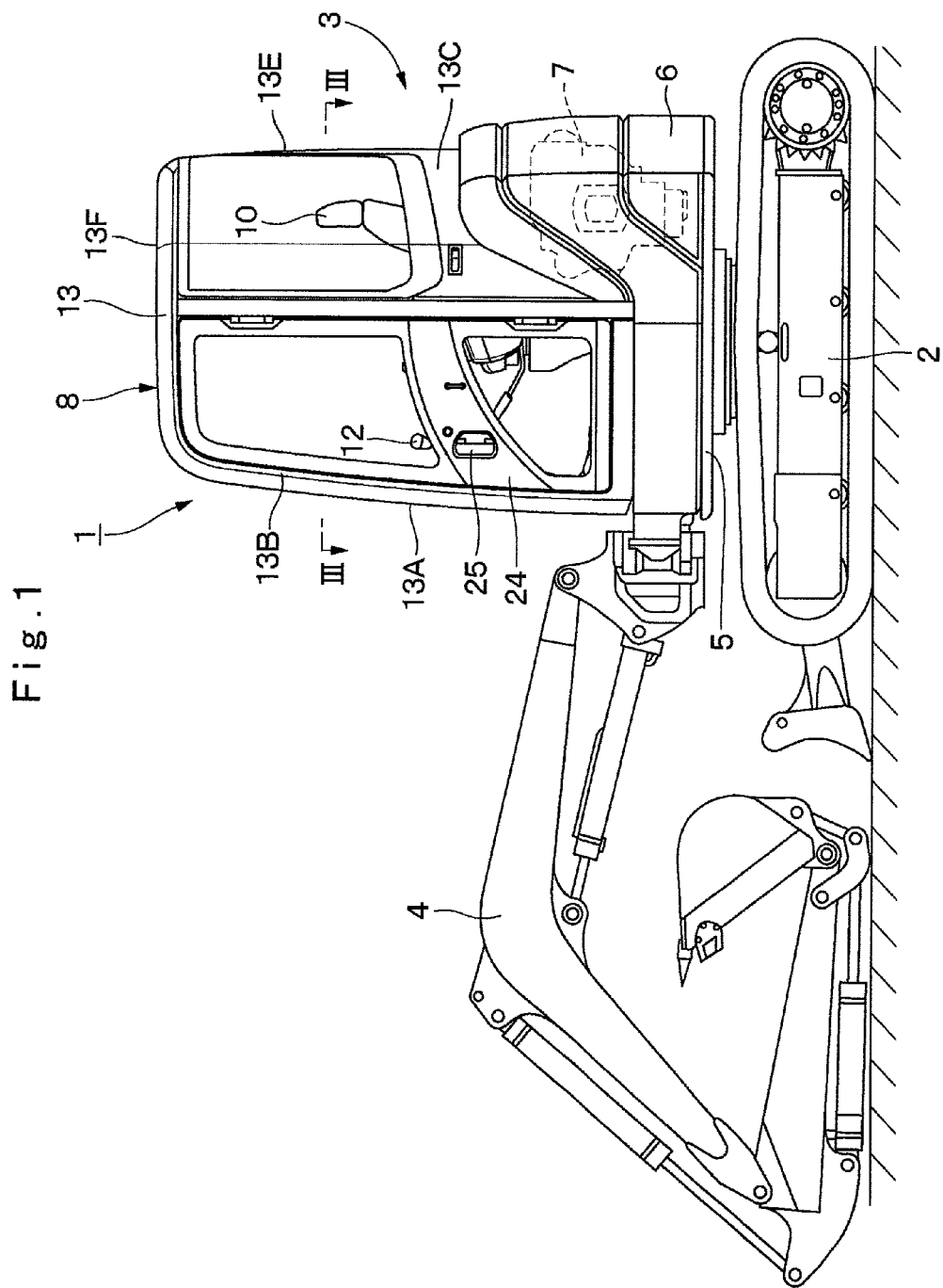
FIG. 1 is a front view illustrating a small-sized hydraulic excavator applied to an embodiment of the present invention.

In FIG. 1, designated at 1 is a hydraulic excavator with cab specification as a construction machine applied to this embodiment, and the hydraulic excavator 1 is a small-sized hydraulic excavator called a mini excavator suitable for a work in a small work site. The hydraulic excavator 1 is composed of an automotive lower traveling structure 2, an upper revolving structure 3 rotatably mounted on the lower traveling structure 2, and a working mechanism 4 provided on the front side in the front-rear direction of the upper revolving structure 3 and carrying out an excavating work of earth and sand, for example.

Figure 2:
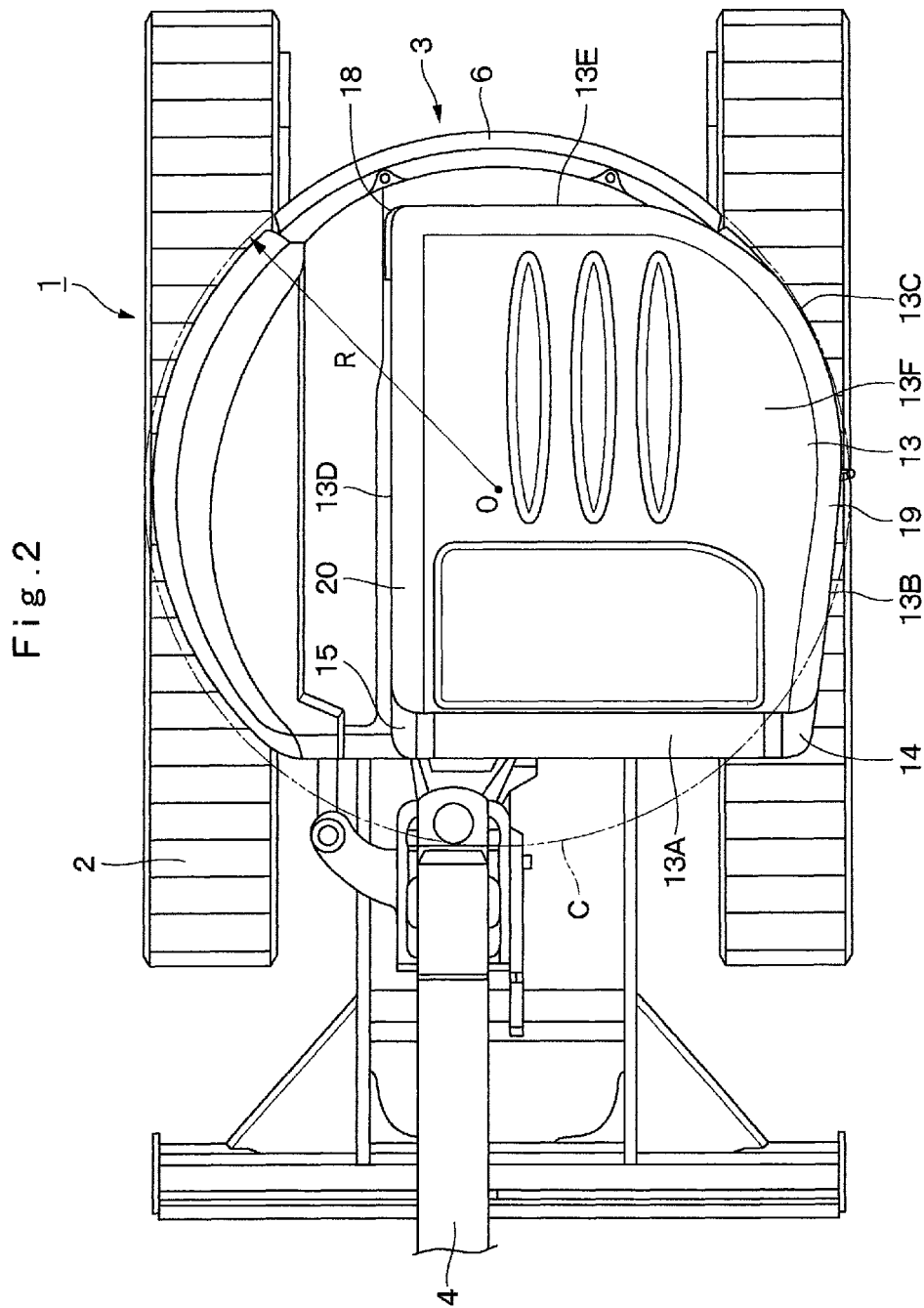
FIG. 2 is a plan view of the hydraulic excavator when seen from above.
Figure 3:
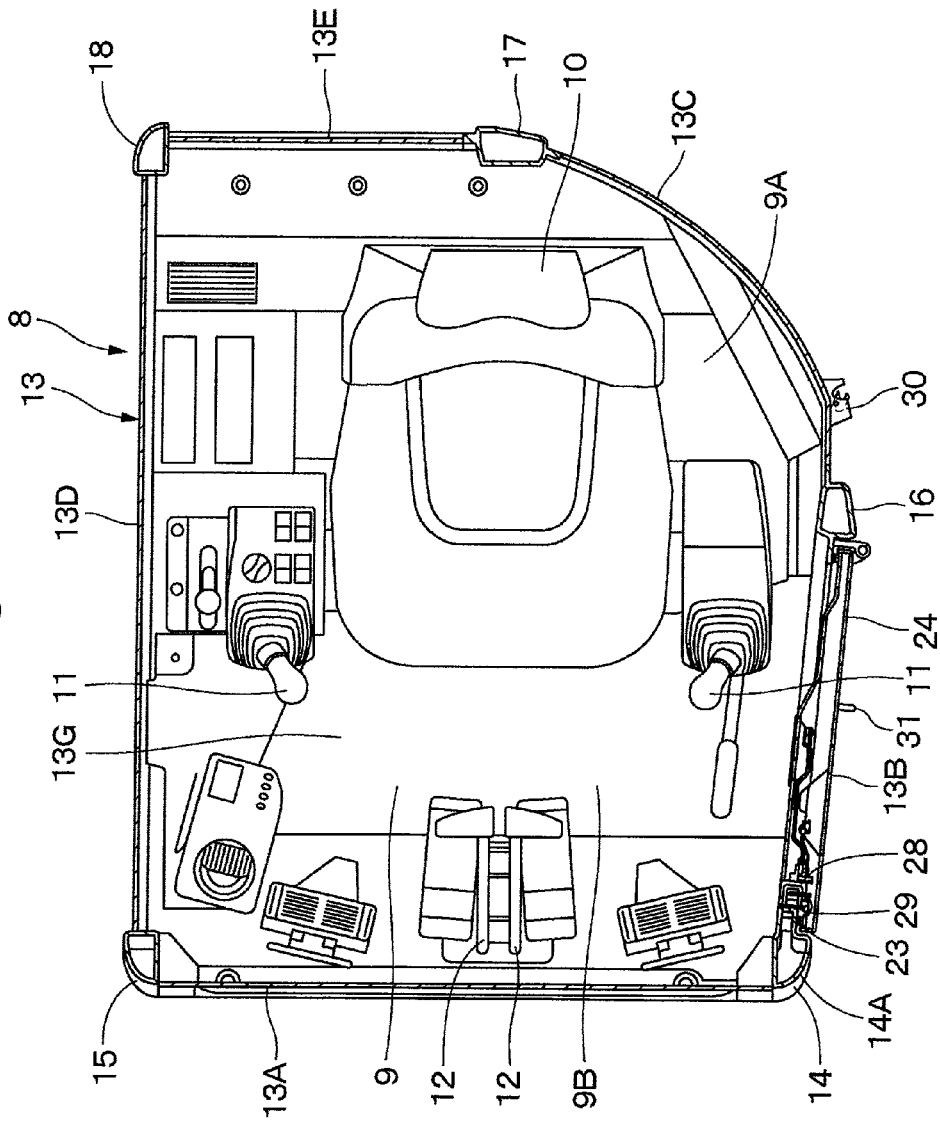
FIG. 3 is a cross-sectional view of an essential part of a cab and the like when seen from a direction of arrows in FIG. 1 in an enlarged manner.

Here, as illustrated in FIG. 2, the upper revolving structure 3 has a width dimension in the left-right direction substantially equal to a vehicle width of the lower traveling structure 2 and is also formed having a substantially circular shape when seen from above so as to be contained in a virtual circle C having a revolving radius R around a revolving center O. Therefore, the hydraulic excavator 1 is configured as a rear small-revolving type hydraulic excavator in which, when the upper revolving structure 3 revolves around the revolving center O on the lower traveling structure 2, a rear surface of a counterweight 6 which will be described later is substantially accommodated in the vehicle width of the lower traveling structure 2.

The above-described revolving radius R is defined by a distance from the revolving center O to the rear surface of the counterweight 6, and the above-described virtual circle C is a trajectory of the rear surface of the counterweight 6 when the upper revolving structure 3 revolves.

The upper revolving structure 3 is composed of a revolving frame 5 forming a support structural body, an engine 7 provided on the revolving frame 5, a cab 8 and the like, which will be described later. On the front side of the revolving frame 5, the working mechanism 4 is provided capable of rocking and moving upward/downward.

The counterweight 6 is provided on a rear part of the revolving frame 5, and the counterweight 6 holds weight balance with the working mechanism 4. As illustrated in FIG. 2, the counterweight 6 is formed by being curved in an arc shape so as to cover the engine 7 which will be described later from the rear side.

The engine 7 is located on the front part of the counterweight 6 and mounted on the rear side of the revolving frame 5 (indicated by a dot line in FIG. 1). This engine 7 is arranged in a lateral state extending in the left-right direction, and the engine 7 is to rotate and drive a hydraulic pump.

The cab 8 is provided on the revolving frame 5. This cab 8 is to form an operator's room on which an operator gets and is formed having a box-shaped body extending in the vertical direction. The cab 8 is composed of a floor member 9, an operator's seat 10, a cab box 13, an entranceway 21, an engaging member 23, a door 24, a door holding member 28 and the like, which will be described later.

The floor member 9 is to have an operator to get on and constitutes a bottom portion of the cab 8. The floor member 9 has its front side position mounted on a front side position of the revolving frame 5, and its rear side position is mounted on the counterweight 6. The floor member 9 is composed of a stepped operator's seat stand 9A located on the rear side and on which the operator's seat 10 which will be described later is mounted, and a footrest area 9B located on the front side of the operator's seat stand 9A and on which the operator places the foot. The rear side of the cab box 13 which will be described later is mounted on the rear side of the operator's seat stand 9A, and the front side of the cab box 13 and an operating lever/pedal 12 for running are provided on the front side of the footrest area 9B.

The operator's seat 10 is provided on the operator's seat stand 9A, and the operator's seat 10 is on which the operator is seated. An operating lever 11 for work is provided on the both left and right sides of the operator's seat 10, and the operating lever/pedal 12 for running is provided on the front-part position of the footrest area 9B which is on the front side.

Indicated at 13 is the cab box provided on the floor member 9. This cab box 13 has five pillars, that is, a left front pillar 14, a right front pillar 15, a left intermediate pillar 16, a left rear pillar 17, and a right rear pillar 18 which are extending in the vertical direction, a left roof pillar 19, and a right roof pillar 20 (See FIG. 2), which will be described later. Spaces between each of these pillars 14 to 20 are a front surface 13A, a left front side surface 13B, a left rear side surface 13C, a right side surface 13D, a rear surface 13E, and a top surface 13F. Moreover, in the cab box 13, an operator's room 13G in which an operator carries out a work is formed on the floor member 9 by being covered by each of the surfaces 13A to 13F.

In this case, the left rear side surface 13C of the cab box 13 is formed as a curved surface having an outward convex arc shape from the left intermediate pillar 16 toward the left rear pillar 17. On the other hand, the left rear side surface 13C is a fixed surface where the door 24 is fixed at this open position when the door 24 which will be described later is opened to the open position on the rear side.

Next, each of the pillars 14 to 18 will be described. First, the left front pillar 14 is disposed on the left front part of the cab box 13 and forms a boundary line between the front surface 13A and the left front side surface 13B. The right front pillar 15 is located on the right front part of the cab box 13 and forms a boundary line between the front surface 13A and the right side surface 13D. The right rear pillar 18 is located on the right rear part of the cab box 13 and forms a boundary line between the right side surface 13D and the rear surface 13E.

The left intermediate pillar 16 is located on the left side of the cab box 13 and provided on the intermediate portion in the front-rear direction and is disposed in the vicinity of the left side of the operator's seat 10 at a boundary position between the left front side surface 13B and the left rear side surface 13C. On the left intermediate pillar 16, the door 24 opening/closing the entrance way 21 which will be described later is mounted rotatably in the horizontal direction.

The left rear pillar 17 is disposed at an intermediate position on the rear side of the cab box 13 and is arranged on the left side of the right rear pillar 18 at an interval of approximately half of a width dimension of the cab box 13. In this case, the left rear pillar 17 is disposed on a rear position of the operator's seat 10 and within a range just behind, not obstructing a rear view of the operator seated on the operator's seat 10.

On the other hand, the left roof pillar 19 is disposed on the upper left side of the cab box 13, and the left roof pillar 19 forms a boundary line between the left front side surface 13B, the left rear side surface 13C, and the top surface 13F of the cab box 13. The rear part side of the left roof pillar 19 has a portion located between the pillars 16 and 17 curved having an outward convex arc shape. The right roof pillar 20 is disposed on the upper right side of the cab box 13 and forms a boundary line between the right side surface 13D and the top surface 13F.

The entrance way 21 is provided between the left front pillar 14 and the left intermediate pillar 16 of the cab box 13. This entrance way 21 is a passage when the operator gets on/off the operator's room 13G in the cab 8 and is opened/closed by the door 24 which will be described later.

Figure 4:
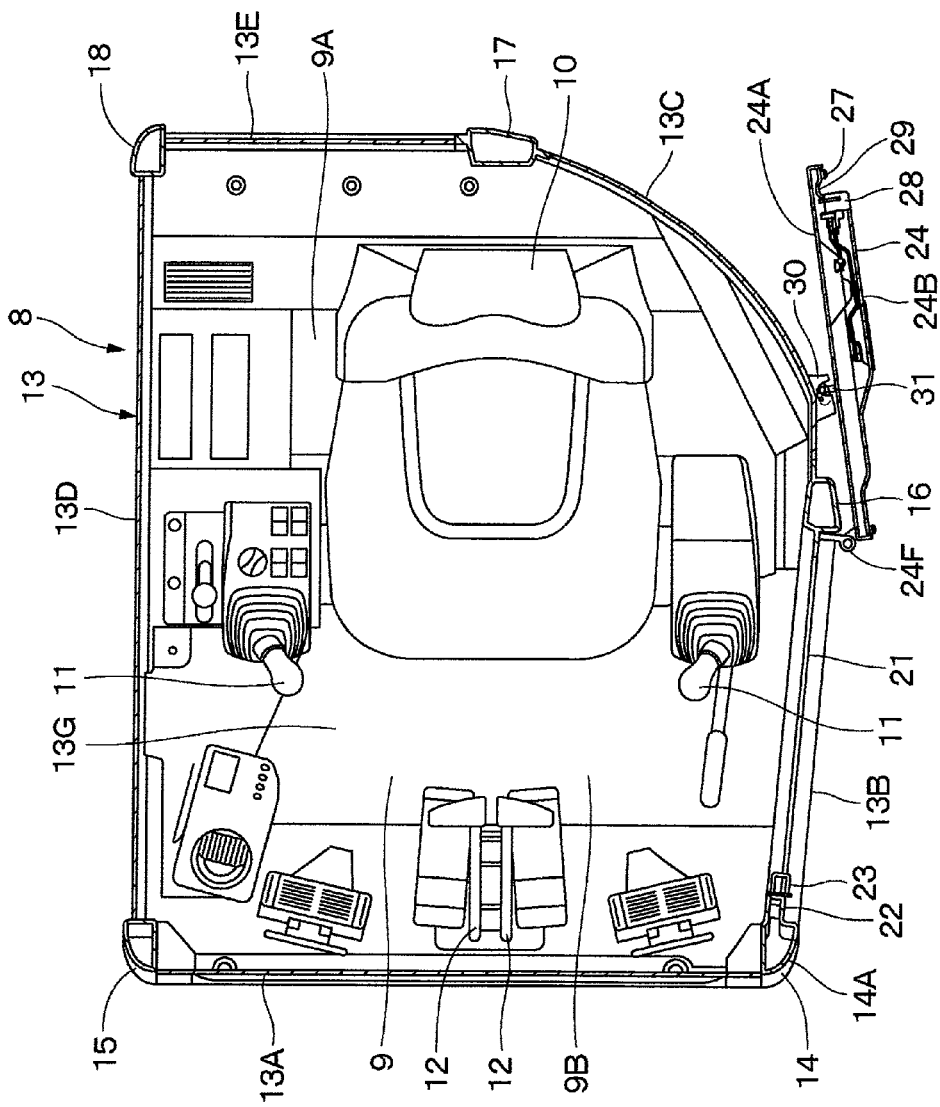
FIG. 4 is a cross-sectional view of an essential part of a state where a door is opened to an open position when seen from the position similar to that in FIG. 3 in an enlarged manner.
Figure 5:
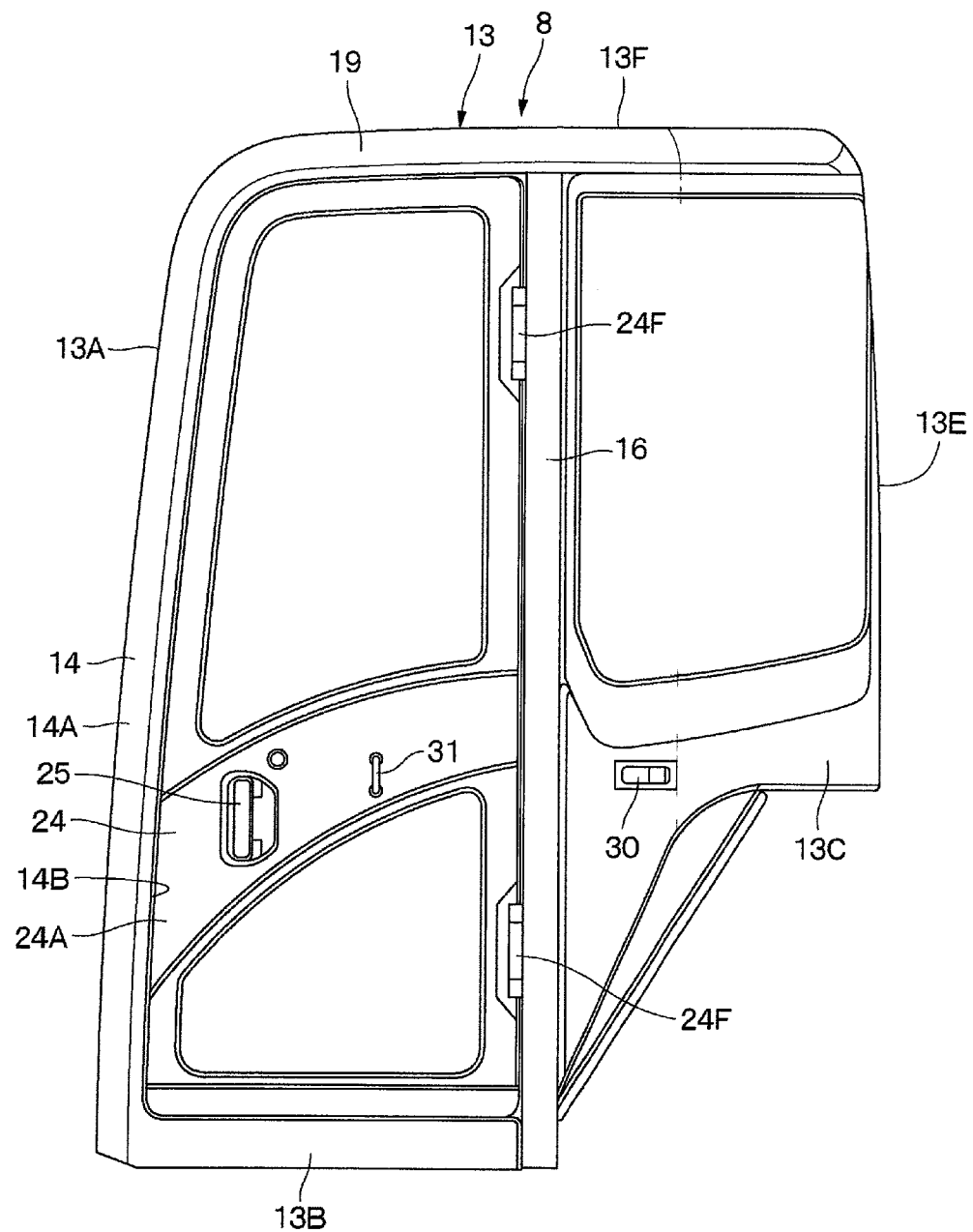
FIG. 5 is a front view illustrating a cab box in a state where the door is closed.
Figure 6:
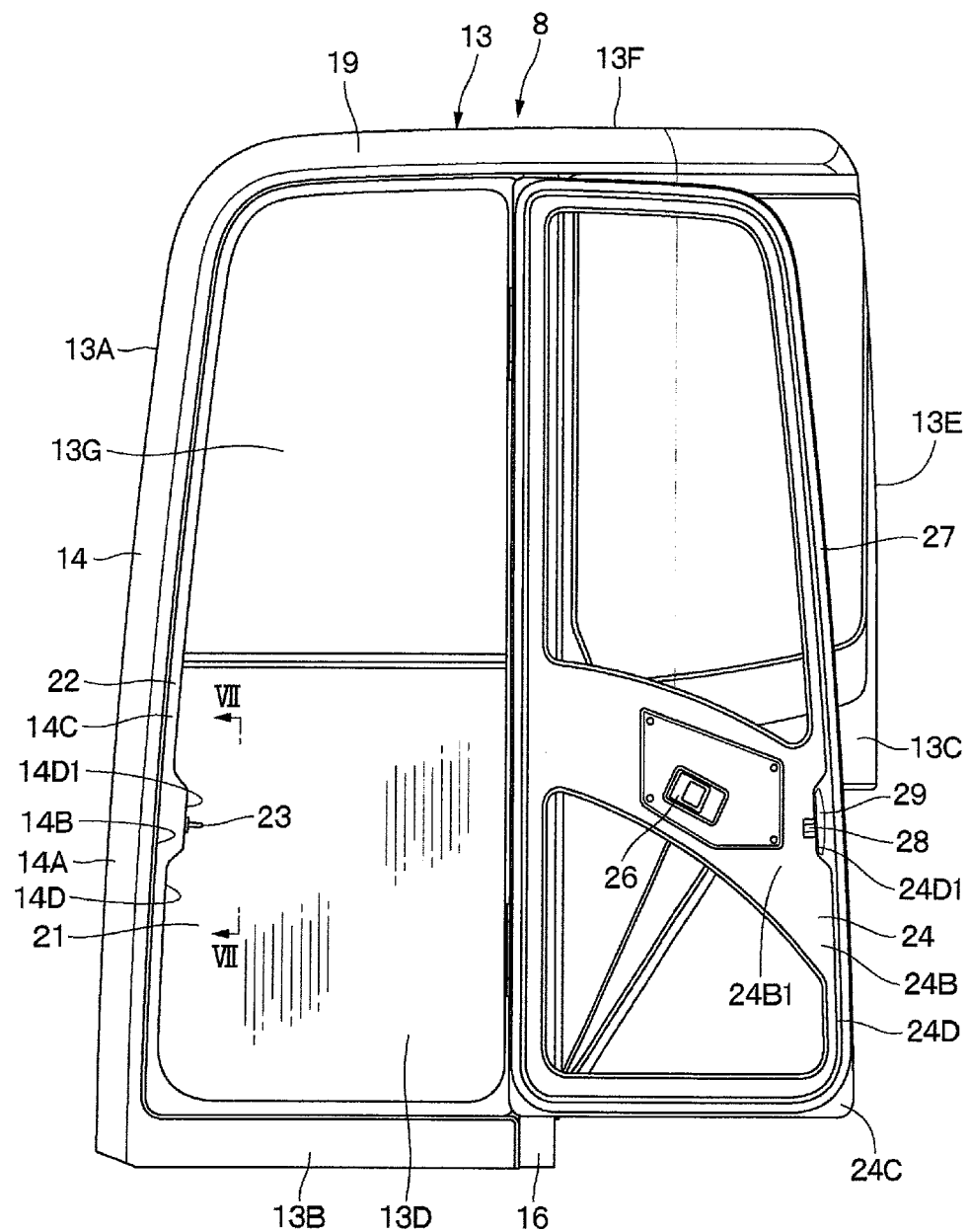
FIG. 6 is a front view illustrating the cab box in a state where the door is open.

Moreover, as illustrated in FIGS. 4 and 6, on the periphery of the entrance way 21, a frame-shaped door accommodating step portion 22 is provided by being surrounded by a rear side part of the left front pillar 14, a front side part of the left intermediate pillar 16, and a lower side part of the left roof pillar 19. This door accommodating step portion 22 accommodates the peripheral portion of the door 24 so that the door 24 does not protrude outward (to the left side) when the door 24 is closed. Therefore, each of cross sectional shapes of the left front pillar 14, the left intermediate pillar 16, and the left roof pillar 19 is a stepped shape in which a part of a cylindrical body is recessed.

Here, the shape of the above-described left front pillar 14 on which the above-described door accommodating step portion 22 is formed and the engaging member 23 which will be described later is mounted and which is one of the features of the present invention will be described in detail.

That is, the left front pillar 14 is formed by using an irregular pipe member curved so as to be gently inclined upward to the rear side. This left front pillar 14 is composed of a left side surface portion 14A curved from the right front side to the left side, a pillar-side stepped surface portion 14B bent from the rear end of the left side surface portion 14A and extending to the right side which becomes the operator's room 13G side in the cab box 13, a pillar-side opposite surface portion 14C provided extending from the depth part of the pillar-side stepped surface portion 14B to the rear side and opposed to the periphery of the closed door 24, a rear surface portion 14D extending from a rear end portion of the pillar-side opposite surface portion 14C to the right side toward the operator's room 13G, and an inner surface portion 14E extending from a front end of the left side surface portion 14A to the right end of the rear surface portion 14D. The pillar-side stepped surface portion 14B and the pillar-side opposite surface portion 14C constitute a front side portion of the above-described door accommodating step portion 22.

The pillar-side stepped surface portion 14B of the left front pillar 14 forms a frame-shaped space for accommodating the periphery of the door 24 when the door 24 is closed. On the other hand, the pillar-side opposite surface portion 14C forms a sealing surface with which a seal member 27 to be described later is brought into elastic contact when the door 24 is closed and is opposed to a door-side opposite surface plate 24C of the door 24.

Figure 7:
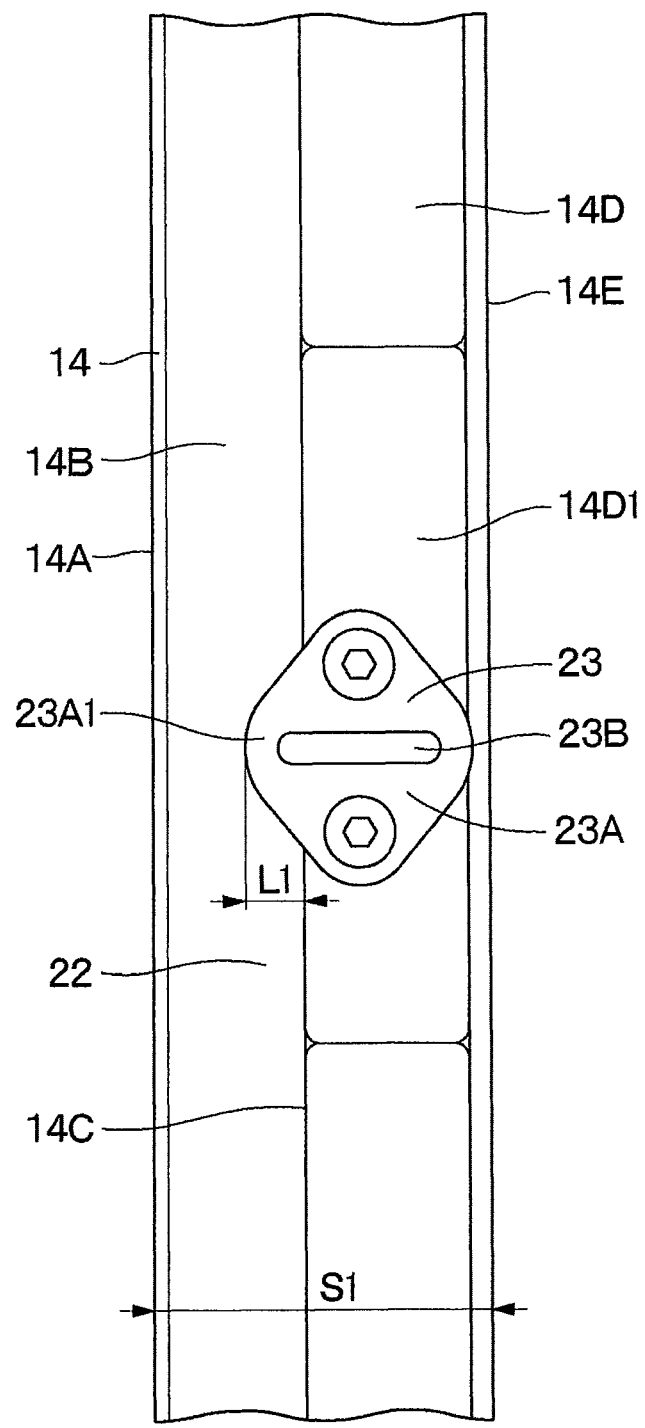
FIG. 7 is a rear view of a left front pillar and an engaging member when seen from a direction of arrows VII-VII in FIG. 6.

As illustrated in FIGS. 6 and 7, the rear surface portion 14D has its intermediate position in the height direction protruding rearward as a convex portion 14D1. This convex portion 14D1 fits in a recessed portion 24D1 provided in the door-side stepped surface plate 24D of the door 24 which will be described later, and the engaging member 23 which will be described later is mounted on the convex portion 14D1. Here, a width dimension S1 (See FIG. 7) in the left-right direction which is the total of the pillar-side stepped surface portion 14B and the rear surface portion 14D is set to a dimension substantially equal to a thickness dimension S2 (See FIG. 9) of a portion where the door holding member 28 is mounted on the door 24. As a result, in a state where the door 24 is closed, this door 24 can be contained in the left front side surface 13B of the cab box 13 without protruding. On the other hand, when seen from the operator's room 13G, too, extension of the door 24 inward to the operator from the left front pillar 14 can be suppressed.

Designated at 23 is the engaging member mounted on the convex portion 14D1 of the rear surface portion 14D constituting the left front pillar 14. This engaging member 23 is to hold the door 24 in a closed state in collaboration with the door holding member 28 which will be described later. The engaging member 23 is composed of a rhomboid flat plate-shaped mounting plate 23A and a U-shaped engaging ring 23B provided protruding horizontally rearward from the mounting plate 23A. This mounting plate 23A is firmly screwed to the convex portion 14D1 of the rear surface portion 14D. In this state, the engaging ring 23B protrudes rearward from the rear surface portion 14D.

Here, the engaging member 23 needs sufficient durability (strength) so as to be able to bear an impact acting when the door 24 is opened/closed for a long time. Thus, since the engaging ring 23B is formed thick and large, the engaging member 23 becomes a component that cannot be easily reduced in size in accordance with a space for mounting. Therefore, the engaging member 23 has a width dimension of its mounting plate 23A larger than a width dimension of the rear surface portion 14D which is a place for mounting.

Figure 14:
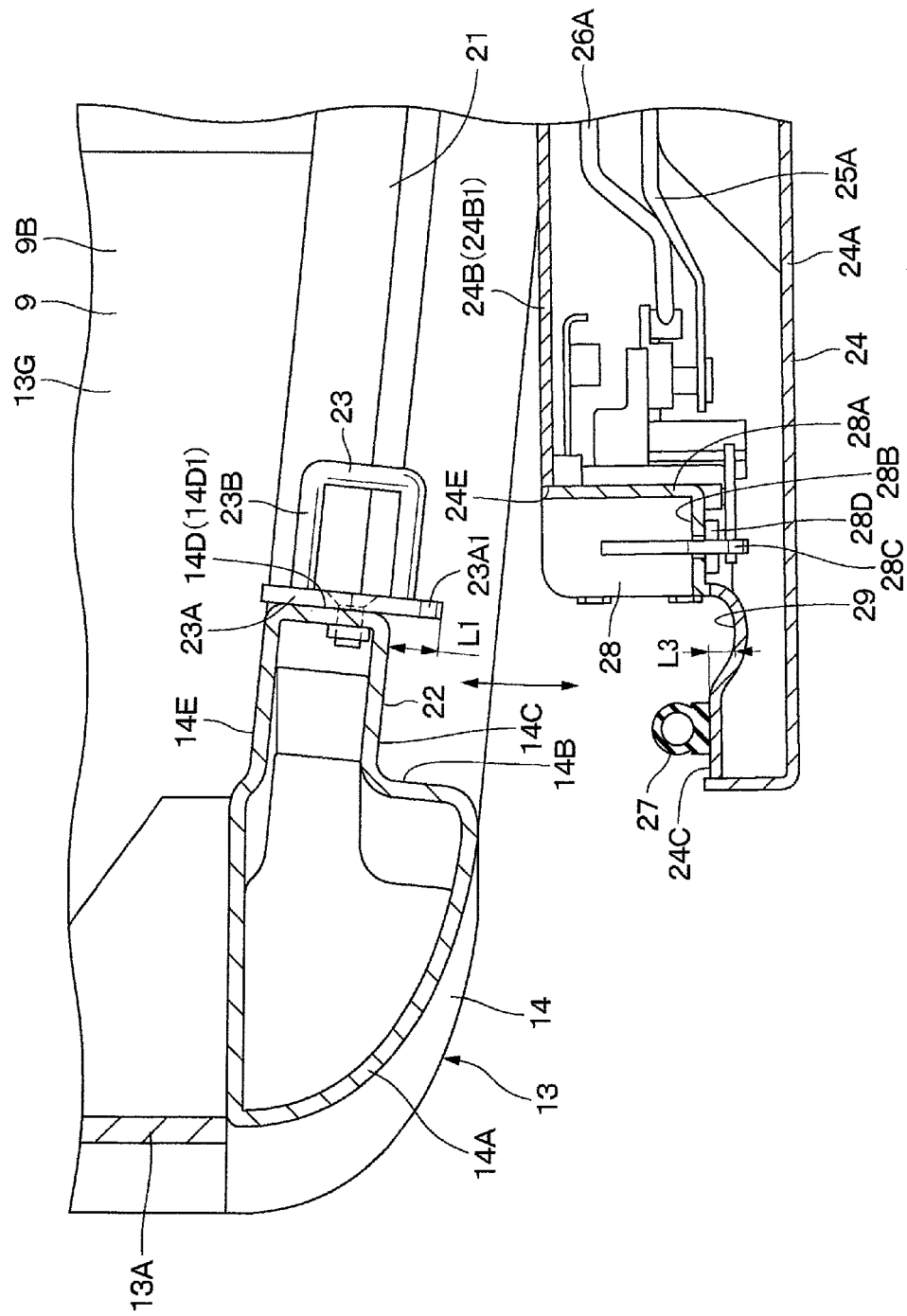
FIG. 14 is an enlarged sectional view of a state in which an engaging member and the door holding member are separated from each other when seen from a position similar to that in FIG. 13.

In this embodiment, the engaging member 23 is arranged close to the outer side so that the inner side portion of the mounting plate 23A does not protrude to the operator's room 13G side in the cab box 13 from the left front pillar 14. With that, as illustrated in FIGS. 7 and 14, the outer side portion of the mounting plate 23A becomes a protruding portion 23A1 protruding outward only by a protruding dimension L1 to the door 24 side with respect to the pillar-side opposite surface portion 14C. As described above, in a case where the engaging member 23 is arranged on the outer side (door 24 side) than the inner surface portion 14E of the left front pillar 14, the door holding member 28 which will be described later to be engaged with this engaging member 23 can be also arranged close to the outer side with respect to the door 24.

Indicated at 24 is the door rotatably mounted on the left intermediate pillar 16 of the cab box 13. This door 24 is to open/close the entrance way 21 and is formed having a substantially rectangular shape which is lengthy in the vertical direction so as to correspond to the entrance way 21, and its rear end side is mounted rotatably in the front-rear direction by using the left intermediate pillar 16 as a fulcrum. The door 24 is operated to be opened/closed between a closed position where the door 24 is rotationally moved to the front side and closes the entrance way 21 of the cab box 13 and an open position where the door 24 is rotationally moved to the rear side and opens the entrance way 21 so as to follow the left rear side surface 13C of the cab box 13.

Figure 9:
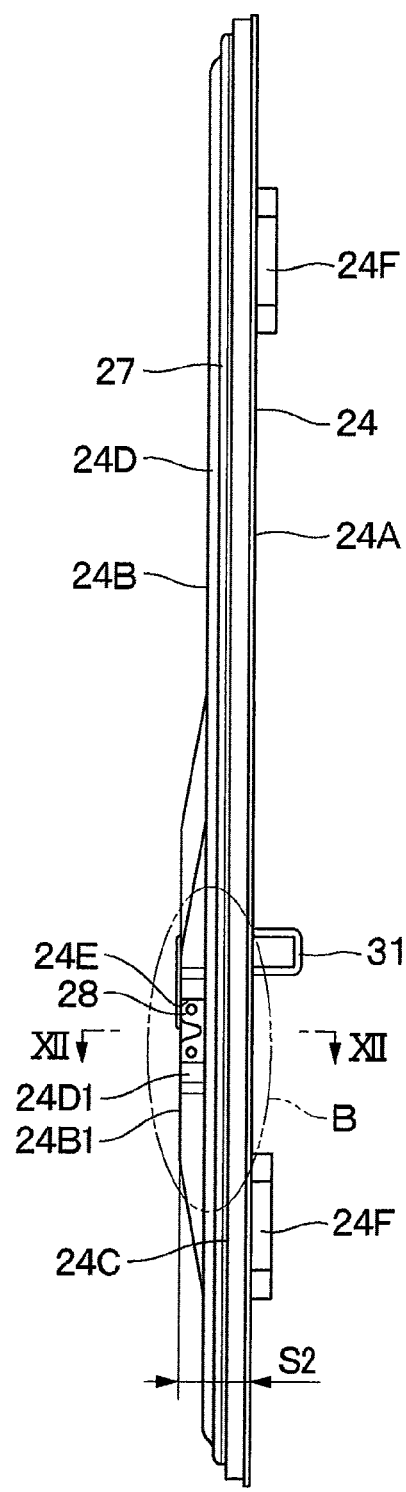
FIG. 9 is a front surface view of the door when seen from a direction of arrows IX-IX in FIG. 8.

In more detail, the door 24 is composed of a substantially flat outer surface plate 24A forming an outer side surface and an inner surface plate 24B opposite to the outer surface plate 24A and forming an inner side surface of the door 24 and shorter than a distal end of the outer surface plate 24A, and by joining the outer surface plate 24A and the inner surface plate 24B, a door with a hollow inside is constituted. As illustrated in FIG. 9, the inner surface plate 24B becomes a bulge portion 24B1 in which an intermediate position in the vertical direction corresponding to the convex portion 14D1 formed on the rear surface portion 14D of the left front pillar 14 is slightly bulged inward, and at the position of this bulge portion 24B1, the door holding member 28 which is located on the front side and will be described later is provided.

On the periphery of the door 24 including the front end side, the door-side opposite surface plate 24C is formed by being located inside of the outer surface plate 24A. This door-side opposite surface plate 24C is opposed to the door accommodating step portion 22 (the pillar-side opposite surface portion 14C of the left front pillar 14) when the door 24 is closed. On the other hand, the seal member 27 which will be described later is mounted on the door-side opposite surface plate 24C. Moreover, on the door-side opposite surface plate 24C, a retreating recessed portion 29 which will be described later is formed by being located on the rear side of the seal member 27.

The door-side stepped surface plate 24D A is formed between the front end portion of the inner surface plate 24B of the door 24 and the rear end portion of the door-side opposite surface plate 24C, and the door-side stepped surface plate 24D is opposed to the rear surface portion 14D of the left front pillar 14. Here, as illustrated in FIG. 6, the door-side stepped surface plate 24D is the recessed portion 24D1 in which its intermediate position in the height direction corresponding to the convex portion 14D1 formed on the rear surface portion 14D of the left front pillar 14 is recessed to the rear side. This recessed portion 24D1 is to avoid the convex portion 14D1 and at the depth part position thereof, the door holding member 28 which will be described later is mounted.

Figure 8:
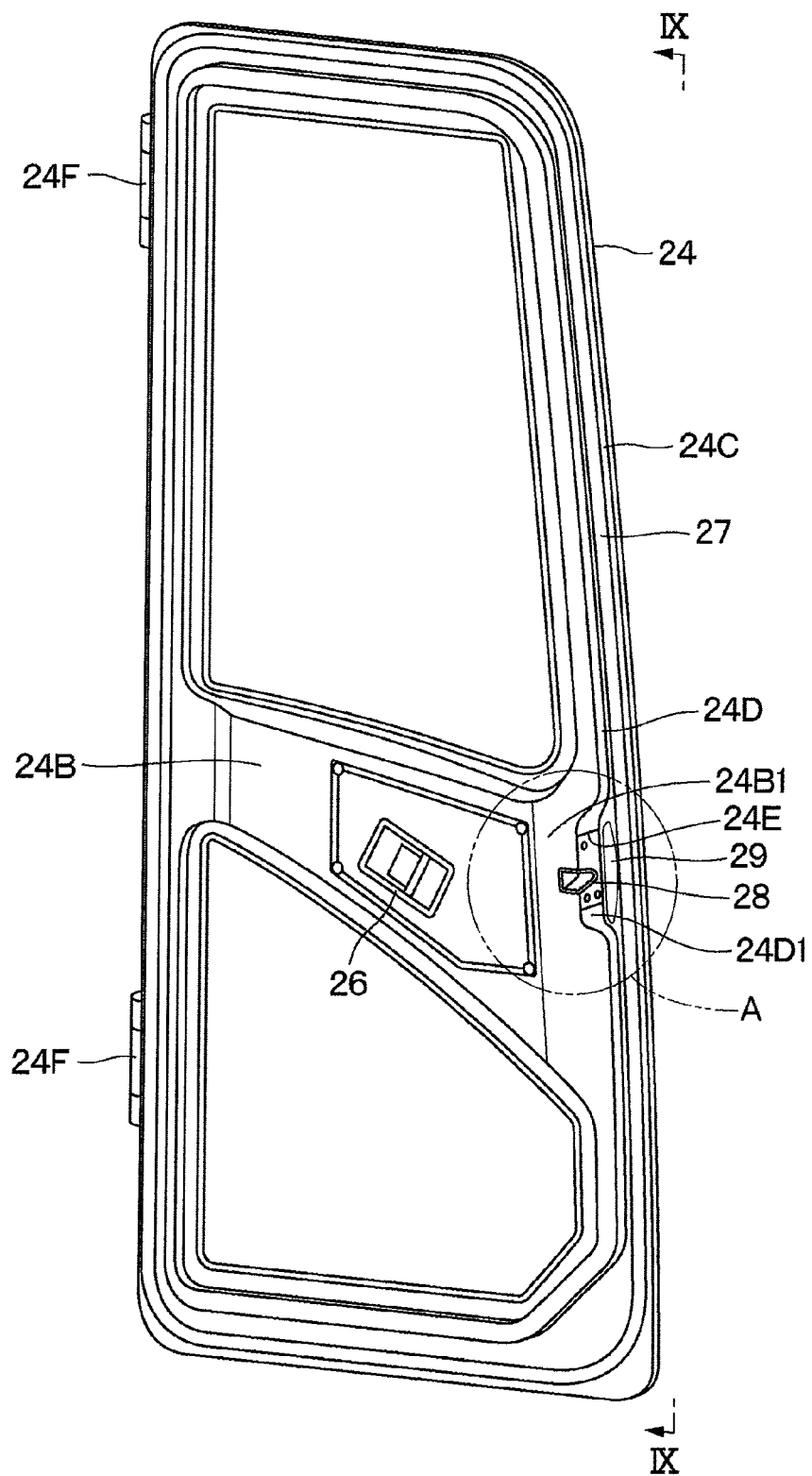
FIG. 8 is an inner surface perspective view illustrating the door as a single body from inside.
Figure 10:
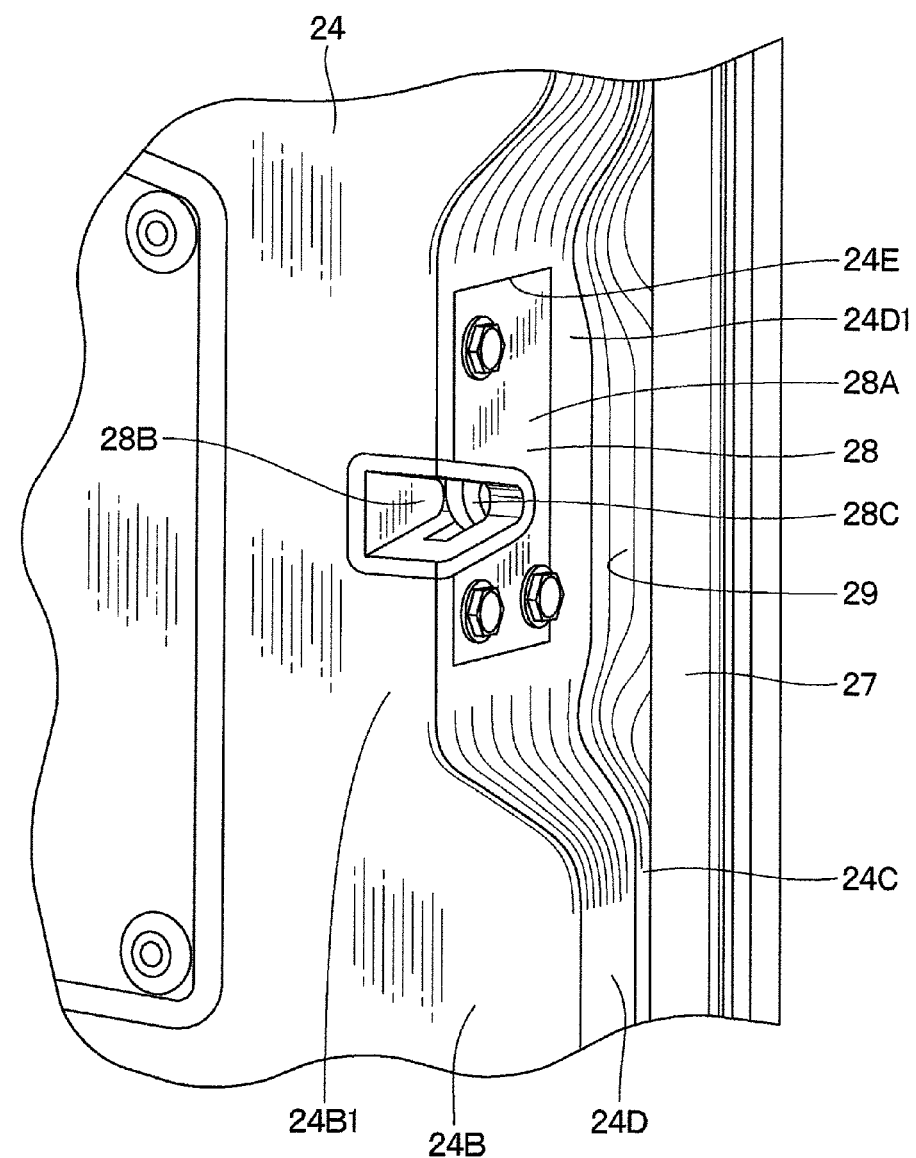
FIG. 10 is a perspective view of an essential part illustrating an A part in FIG. 8 in an enlarged manner.
Figure 13:
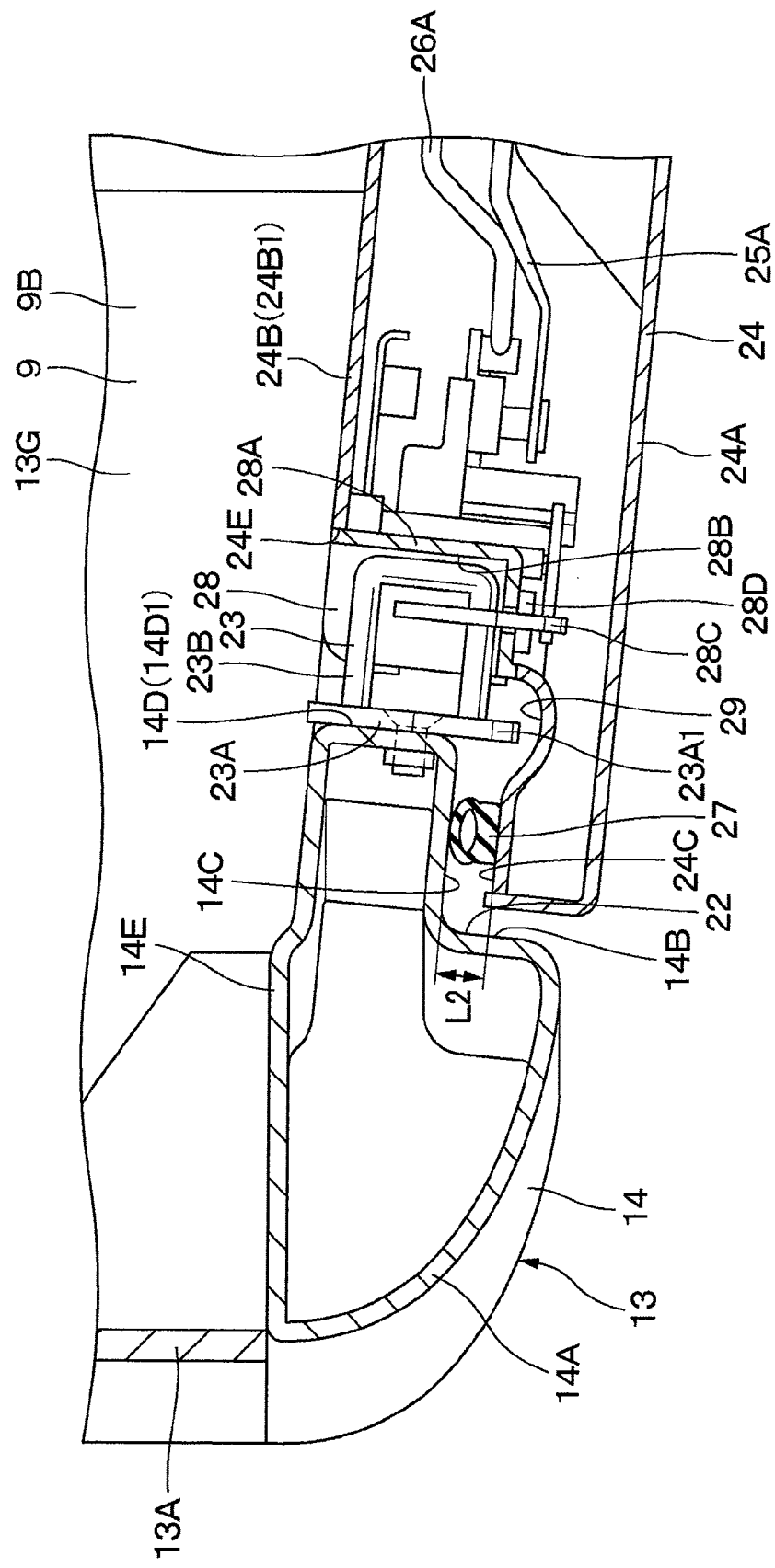
FIG. 13 is an enlarged sectional view illustrating an essential part in FIG. 12 in an enlarged manner.

As illustrated in FIGS. 8, 10, 13 and the like, amounting opening 24E is provided on the door-side stepped surface plate 24D of the door 24. This mounting opening 24E is provided at a position corresponding to the engaging member 23, that is, on the recessed portion 24D1 of the door-side stepped surface plate 24D. The mounting opening 24E is an opening for mounting the door holding member 28 and is formed so as to fit the outer shape of a case 28A of the door holding member 28 so that the case 28A can be fitted therein.

On the other hand, door hinges 24F are provided at two spots, that is, upper and lower spots on the rear end side of the door 24, and the door 24 is mounted on the left intermediate pillar 16 rotatably by each of the door hinges 24F. An outer side door knob 25 for operating the door holding member 28 from the outside is provided on the outer surface plate 24A, and the outer side door knob 25 can rotate and operate an engaging pawl 28C of the door holding member 28 through a link member 25A. An inner side door knob 26 for operating the door holding member 28 from the operator's room 13G is provided on the inner surface plate 24B, and the inner side door knob 26 can rotate and operate the engaging pawl 28C of the door holding member 28 through the link member 26A (See FIG. 12).

Moreover, the seal member 27 located on the peripheral edge side is provided on the door-side opposite surface plate 24C of the door 24, and the seal member 27 is formed of a rubber material and the like having elasticity and flexibility. As illustrated in FIG. 13, the seal member 27 seals a space between the cab box 13 and the door 24 by being pressed onto the door accommodating step portion 22 (the pillar-side opposite surface portion 14C of the left front pillar 14) when the door 24 is closed so that intrusion of dusts, outside air, noise and the like is suppressed and rattling of the door 24 can be prevented.

Here, the seal member 27 is deformed so as to collapse by being pressed onto the pillar-side opposite surface portion 14C of the left front pillar 14 when the door 24 is closed. At this time, the seal member 27 has a width dimension of a dimension L2 when it is deformed. The case in which the seal member 27 is provided on the door-side opposite surface plate 24C of the door 24 is exemplified but it may be configured to be provided on the door accommodating step portion 22 including the pillar-side opposite surface portion 14B on the cab box 13 side.

Designated at 28 is the door holding member provided on the mounting opening 24E of the door-side stepped surface plate 24D. This door holding member 28 is arranged so as to oppose the engaging member 23 and to hold the door 24 at the closed position by being engaged with the engaging ring 23B of the engaging member 23 when the door 24 is rotationally moved to the front side and closed. The door holding member 28 is provided on the depth part of the recessed portion 24D1 formed on the door-side stepped surface plate 24D of the door 24. Specifically, the door holding member 28 is mounted at a height position corresponding to the engaging member 23.

The door holding member 28 is roughly composed of the box-body shaped case 28A mounted on the mounting opening 24E, a notched groove 28B located on the inner surface plate 24B side (engaging member 23 side) and provided by being opened to the case 28A, the engaging pawl 28C rotatably provided in the case 28A and going into/out of the notched groove 28B, a support shaft 28D rotatably supporting the engaging pawl 28C with respect to the case 28A, and a spring member (not shown) arranged at a release position or a lock position which will be described later by biasing the engaging pawl 28C. The engaging pawl 28C is connected to each of the door knobs 25 and 26 through the link members 25A and 26A.

Figure 11:
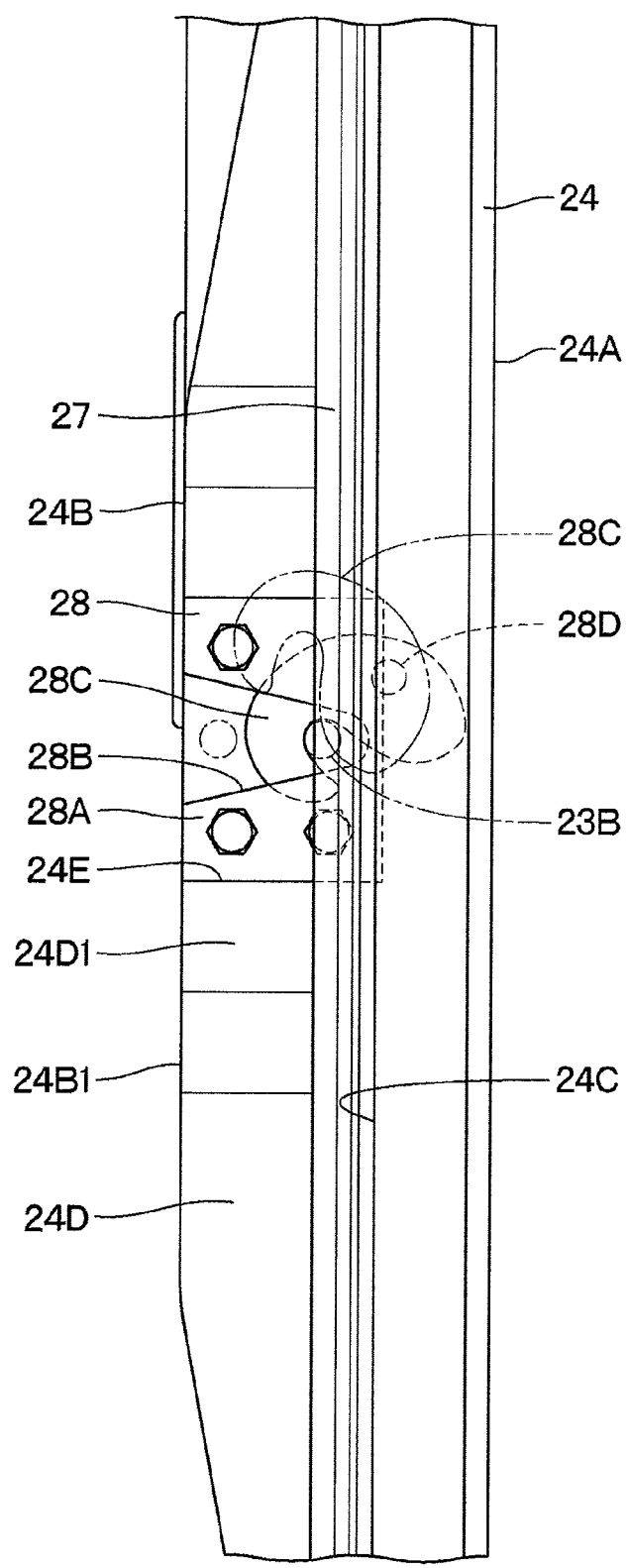
FIG. 11 is an enlarged view of an essential part of the door front end side illustrating a B part in FIG. 9 in an enlarged manner.
Figure 12:
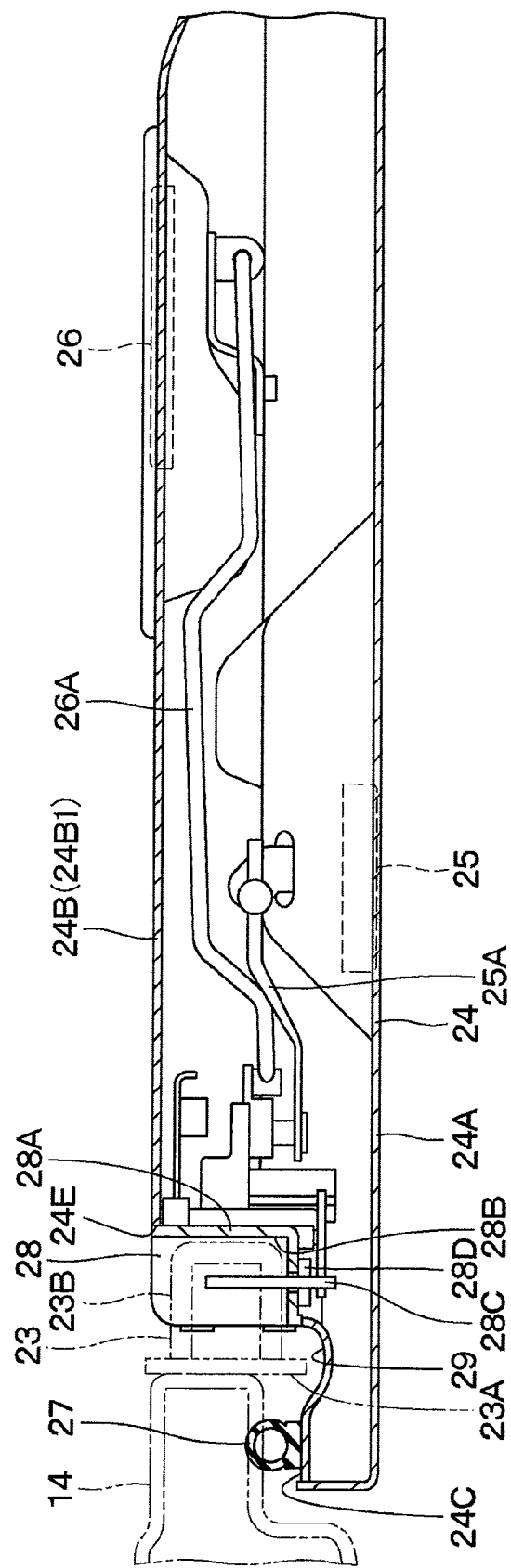
FIG. 12 is a cross-sectional view of a connection relationship between a door holding member and each door knob when seen from a direction of arrows XII-XII in FIG. 9.

Therefore, as indicated by a two-dot chain line in FIG. 11, the door holding member 28 has the engaging pawl 28C disposed at the release position outside of the notched groove 28B in a state in which the door 24 is open. On the other hand, as indicated by a solid line and a dot line in FIG. 11, when the door 24 is closed and the engaging ring 23B of the engaging member 23 enters the depth part of the notched groove 28B, the engaging pawl 28C is arranged at a lock position protruding to the notched groove 28B. At this lock position, the engaging pawl 28C is engaged with the engaging ring 23B and can hold the door 24 at the closed position. Moreover, the door holding member 28 can release the engagement of the engaging pawl 28C with the engaging ring 23B (rotationally move to the release position) by operating the outer side door knob 25 or the inner side door knob 26, and in this state, the door 24 can be opened.

Here, since the engaging member 23 is arranged close to the outer side of the left front pillar 14 (close to the door 24 side), the door holding member 28 can be arranged close to the outer side of the door 24 in correspondence with this engaging member 23. Therefore, since the door holding member 28 is provided, an extension dimension of the bulge portion 24B1 extended from the inner surface plate 24B of the door 24 can be kept small by a portion of arrangement of the engaging member 23 close to the outer side. For example, the thickness dimension S2 of the door 24 including the extension dimension of the bulge portion 24B1 can be set to a dimension substantially equal to the width dimension of the left front pillar 14 or the left intermediate pillar 16. Thus, large extension of the bulge portion 24B1 into the operator's room 13G of the cab box 13 can be suppressed.

Designated at 29 is the retreating recessed portion provided on the door-side opposite surface plate 24C at a position opposed to the mounting plate 23A of the engaging member 23. As illustrated in FIGS. 10 and 14, this retreating recessed portion 29 is located between the seal member 27 and the door holding member 28 and is formed by having the door-side opposite surface plate 24C recessed to the outer side (left side) in the substantially same height range as the door holding member 28, for example. The retreating recessed portion 29 is to avoid interference (contact) of the protruding portion 23A1 of the mounting plate 23A of the engaging member 23 protruding outward from the rear surface portion 14D of the left front pillar 14, and its deepest portion has a depth dimension L3. This depth dimension L3 of the retreating recessed portion 29 is set to a dimension large enough to avoid interference with the protruding portion 23A1 of the mounting plate 23A even if the door 24 is closed in a rush and the seal member 27 is largely deformed. Therefore, the depth dimension L3 of the retreating recessed portion 29 is set to a value larger than a value obtained by subtracting the width dimension L2 when the door 24 is closed and the seal member 27 is deformed from the protruding dimension L1 of the protruding portion 23A1 provided on the mounting plate 23A of the engaging member 23, that is, with a relationship of the following formula 1.

$$L3 > L1 - L2 \qquad \text{[Formula 1]}$$

As described above, since the retreating recessed portion 29 is provided on the door-side opposite surface plate 24C of the door 24, the engaging member 23 can be arranged close to the outer side (outer surface plate 24A side). By arranging the engaging member 23 close to the outer side, the extension dimension of the inner surface plate 24B of the door 24 can be kept small, and the door 24 can have a thin shape.

Indicated at 30 is a catch (See FIG. 3) provided on the left rear side surface 13C of the cab box 13. On the other hand, indicated at 31 is a striker provided on the outer surface plate 24A of the door 24 so as to correspond to the catch 30. As illustrated in FIG. 4, the catch 30 and the striker 31 are engaged with each other and can hold the door 24 at the open position when the door 24 is opened to a position following the left rear side surface 13C. On the other hand, by operating a release lever (not shown) provided in the cab 8, engagement between the catch 30 and the striker 31 can be disengaged.

The hydraulic excavator 1 according to this embodiment has the above-described configuration, and an operation thereof will be described below.

The operator opens the door 24 and gets onto the cab 8 through the entrance way 21, closes the door 24 and sits on the operator's seat 10. In this state, by operating the operating lever/pedal 12 for running, the lower traveling structure 2 can be made to run. On the other hand, by operating the operating lever 11 for work, the upper revolving structure 3 can be revolved, and the working mechanism 4 can be moved upward/downward so as to carry out an excavating work of earth and sand or the like.

Here, since the engaging member 23 and the door holding member 28 are arranged close to the outer side (close to the door 24 side), the extension dimension of the door holding member 28 extended into the cab 8 when the door 24 is closed can be kept small and thus, the operator's room 13G in the cab box 13 can be made larger.

Moreover, when the hydraulic excavator 1 is to carry out a work, the work might be carried out in a state in which the door 24 is opened and the entrance way 21 is kept open. In this case, by opening the door 24 to the position following the left rear side surface 13C and by engaging the catch 30 and the striker 31 with each other, the work can be carried out in a state in which the door 24 is kept open. At this time, since the extension dimension of the inner surface plate 24B of the door 24 is kept small, interference between this inner surface plate 24B and a peripheral obstacle can be suppressed.

Thus, according to this embodiment, the left front pillar 14 is composed of the left side surface portion 14A curved from the right front side to the left side, the pillar-side stepped surface portion 14B extending to the right side which becomes the operator's room 13G side in the cab box 13 while bending from the rear end of the left side surface portion 14A, the pillar-side opposite surface portion 14C provided extending from the depth part of the pillar-side stepped surface portion 14B to the rear side and opposed to the periphery of the closed door 24, the rear surface portion 14D extending from the rear end portion of the pillar-side opposite surface portion 14C to the right side, and the inner surface portion 14E extending from the front end of the left side surface portion 14A to the right end of the rear surface portion 14D.

The door 24 is composed of the outer surface plate 24A forming the outer side surface, the inner surface plate 24B opposed to the outer surface plate 24A and forming the inner side surface of the door 24, the door-side opposite surface plate 24C arranged inside of the outer surface plate 24A by being located on the front end side of the inner surface plate 24B and opposed to the pillar-side opposite surface portion 14C of the left front pillar 14 when the door 24 is closed, the door-side stepped surface plate 24D forming a step between the inner surface plate 24B and the door-side opposite surface plate 24C, and the mounting opening 24E provided at a position corresponding to the engaging member 23 of the door-side stepped surface plate 24D. Moreover, the door holding member 28 is provided between the front end portion of the inner surface plate 24B and the rear end portion of the door-side opposite surface plate 24C, that is, on the recessed portion 24D1 of the door-side stepped surface plate 24D.

Moreover, the mounting plate 23A of the engaging member 23 is mounted on the rear surface portion 14D in a state in which its protruding portion 23A1 is made to protrude to the door 24 side from the pillar-side opposite surface portion 14C of the left front pillar 14, and the retreating recessed portion 29 for avoiding interference with the protruding portion 23A1 of the mounting plate 23A is provided in the door-side opposite surface plate 24C of the door 24.

Therefore, since the retreating recessed portion 29 is provided in the door-side opposite surface plate 24C of the door 24 opposite to the protruding portion 23A1 of the mounting plate 23A of the engaging member 23, even if the mounting plate 23A of the engaging member 23 is provided on the rear surface portion 14D of the left front pillar 14 in a state in which the protruding portion 23A1 protrudes outward from the pillar-side opposite surface portion 14C, when the door 24 is closed, interference with the protruding portion 23A1 of the mounting plate 23A can be prevented.

In this case, as illustrated in the formula 1, regarding the retreating recessed portion 29, its depth dimension L3 is set to a value larger than a value obtained by subtracting the width dimension L2 when the door 24 is closed and the seal member 27 is deformed from the protruding dimension L1 of the protruding portion 23A1 provided on the mounting plate 23A of the engaging member 23. As a result, even if the seal member 27 is largely deformed by closing the door 24 in a rush, collision between the protruding portion 23A1 of the mounting plate 23A and the retreating recessed portion 29 can be reliably prevented, and durability of the door 24 can be improved.

In addition, since the engaging member 23 can be arranged close to the door 24 side so as not to protrude to the operator's room 13G side from the left front pillar 14, the door holding member 28 to be engaged with this engaging member 23 can be also arranged close to the outer surface plate 24A side (outer side) of the door 24. As a result, even if the cab 8 to be mounted is small such as in the case of the super small-sized hydraulic excavator 1, for example, the operator's room 13G in the cab box 13 can be effectively enlarged by a portion of arrangement of drawing back the door holding member 28 to the outside, and a work environment of the operator can be made favorable.

As described above, by keeping the extension dimension of the door 24 to the inside small, the protruding dimension to the outside when the door 24 is opened to a position following the left rear side surface 13C can be made small. As a result, even if a work is to be carried out while the door 24 is largely open, the operator can carry out the work without being excessively aware of the open door 24, and the workability at this time can be improved.

Further, since the retreating recessed portion 29 is provided by being recessed in the door-side opposite surface plate 24C which is separate from the outer surface plate 24A of the door 24, the outer surface plate 24A exposed to the outside can be formed flat, and appearance can be made favorable.

On the other hand, since the seal member 27 is configured to be provided on the door-side opposite surface plate 24C of the door 24 and the seal member 27 is brought into contact with the pillar-side opposite surface portion 14C of the left front pillar 14, the space between the cab box 13 and the door 24 can be sealed in order to suppress intrusion of dusts, outside air, noise and the like. Rattling of the door 24 can be prevented. Moreover, the retreating recessed portion 29 can be provided by using the space between the door holding member 28 and the seal member 27.

The door holding member 28 has the case 28A mounted on the mounting opening 24E of the door 24 and the engaging pawl 28C rotatably provided on the case 28A and engaged with the engaging ring 23B of the engaging member 23. Therefore, by mounting the case 28A of the door holding member 28 on the mounting opening 24E, the door holding member 28 can be contained between the outer surface plate 24A and the inner surface plate 24B of the door 24.

Moreover, since the outer side door knob 25 and the inner side door knob 26 are provided on the door 24, the door 24 can be opened by rotationally moving the engaging pawl 28C through operation of the outer side door knob 25 or the inner side door knob 26.

It should be noted that, in the embodiment, the case in which the door holding member 28 and the retreating recessed portion 29 are provided on the single door 24 is explained as an example. However, the present invention is not limited to the same and may be configured to be applied to a folding door in which a front side door and a rear side door are connected by a hinge, for example.

In the embodiment, the hydraulic excavator 1 with cab specification provided with the crawler-type lower traveling structure 2 as a construction machine is explained as an example. However, the present invention is not limited to the same and may be applied to a hydraulic excavator or the like with cab specification provided with a wheel-type lower traveling structure, for example. Moreover, the present invention may be applied to other construction machines such as a hydraulic crane and the like as long as the construction machine is provided with a cab.

DESCRIPTION OF REFERENCE NUMERALS

1: Hydraulic excavator (Construction machine)
2: Lower traveling structure
3: Upper revolving structure
4: Working mechanism
5: Revolving frame
8: Cab
9: Floor member
10: Operator's seat
13: Cab box
13A: Front surface
13B: Left front side surface
13C: Left rear side surface
13D: Right side surface
13E: Rear surface
13F: Top surface
13G: Operator's room
14: Left front pillar
14A: Left side surface portion
14B: Pillar-side stepped surface portion
14C: Pillar-side opposite surface portion
14D: Rear surface portion
14E: Inner surface portion
15: Right front pillar
16: Left intermediate pillar
17: Left rear pillar
18: Right rear pillar
21: Entrance way
23: Engaging member
23A: Mounting plate
23A1: Protruding portion
23B: Engaging ring
24: Door
24A: Outer surface plate
24B: Inner surface plate
24C: Door-side opposite surface plate
24D: Door-side stepped surface plate
24D1: Recessed portion
24E: Mounting opening
25: Outer side door knob
26: Inner side door knob
27: Seal member
28: Door holding member
28A: Case
28B: Notched groove
28C: Engaging pawl
29: Retreating recessed portion
L1: Protruding dimension of protruding portion on mounting plate
L2: Width dimension when seal member is deformed
L3: Depth dimension of retreating recessed portion

The invention claimed is:

1. A construction machine comprising:
an automotive lower traveling structure (2);
an upper revolving structure (3) rotatably mounted on said lower traveling structure (2) and having a cab (8) provided on a revolving frame (5) forming a support structural body; and
a working mechanism (4) provided on the front side in the front-rear direction of said upper revolving structure (3), capable of moving upward/downward;
said cab (8) being provided with a cab box (13) in which five pillars (14 to 18) are provided extending in the vertical direction by being located on left front, right front, left intermediate, left rear, and right rear and a space between each of said pillars (14 to 18) is covered by a front surface (13A), a left front side surface (13B), a left rear side surface (13C), a right side surface (13D), a rear surface (13E), and a top surface (13F) and the inside becomes an operator's room (13G); and
a door (24) having the rear end side mounted on said left intermediate pillar (16) rotatably in the front-rear direction in order to open/close an entrance way (21) between said left front pillar (14) and said left intermediate pillar (16) of said cab box (13), characterized in that:
said left front pillar (14) is formed of a pillar-side stepped surface portion (14B) in which an intermediate portion in the front-rear direction of a left side surface portion (14A) is bent to said operator's room (13G) side, a pillar-side opposite surface portion (14C) provided extending to the rear side from a depth portion of said pillar-side stepped surface portion (14B) and opposed to said door (24) in a closed state, and a rear surface portion (14D) extending from a rear end portion of said pillar-side opposite surface portion (14C) to said operator's room (13G) side;
an engaging member (23) composed of a mounting plate (23A) having a protruding portion (23A1) protruding to said door (24) side from said pillar-side opposite surface portion (14C) and an engaging ring (23B) protruding rearward from said mounting plate (23A) is provided on said rear surface portion (14D) of said left front pillar (14);
said door (24) has an outer surface plate (24A) forming an outer side surface of said door (24), an inner surface plate (24B) opposite to said outer surface plate (24A) and forming an inner side surface of said door (24), a door-side opposite surface plate (24C) arranged inside said outer surface plate (24A) by being located on the front side of said inner surface plate (24B) and opposed to said pillar-side opposite surface portion (14C) when said door (24) is closed, a door-side stepped surface plate (24D) forming a step between said inner surface plate (24B) and said door-side opposite surface plate (24C), and a mounting opening (24E) provided on said door-side stepped surface plate (24D) at a position corresponding to said engaging member (23);

a door holding member (28) opposite to said engaging ring (23B) of said engaging member (23) and holding said door (24) at a closed position by being engaged with said engaging ring (23B) when said door (24) is closed is provided on said mounting opening (24E) of said door (24);

a retreating recessed portion (29) located on the front side of said door holding member (28) and recessed toward said outer surface plate (24A) is provided on said door-side opposite surface plate (24C) of said door (24); and when said door (24) is brought to the closed position, interference with said protruding portion (23A1) of said mounting plate (23A) of said engaging member (23) is avoided by said retreating recessed portion (29).

2. The construction machine according to claim 1, wherein a seal member (27) for sealing a space between said cab box (13) and said door (24) is provided on either one side of said pillar-side opposite surface portion (14C) of said left front pillar (14) and said door-side opposite surface plate (24C) of said door (24); and said retreating recessed portion (29) is arranged between said door holding member (28) and said seal member (27).

3. The construction machine according to claim 2, wherein a depth dimension (L3) of said retreating recessed portion (29) is set to a value larger than a difference between a protruding dimension (L1) of said protruding portion (23A1) provided on said mounting plate (23A) of said engaging member (23) and a width dimension (L2) when said seal member (27) is deformed by closing said door (24).

4. The construction machine according to claim 1, wherein said door holding member (28) has a case (28A) mounted on said mounting opening (24E) of said door (24) and an engaging pawl (28C) provided rotatably on said case (28A) and engaged with said engaging ring (23B) of said engaging member (23) when said door (24) is closed.

5. The construction machine according to claim 4, wherein on said outer surface plate (24A) of said door (24), an outer side door knob (25) for operating said engaging pawl (28C) from the outside is provided; and on said inner surface plate (24B) of said door (24), an inner side door knob (26) for operating said engaging pawl (28C) from said operator's room (13G) is provided.

* * * * *